United States Patent
Wong et al.

(10) Patent No.: US 10,432,798 B1
(45) Date of Patent: Oct. 1, 2019

(54) SYSTEM, METHOD, AND APPARATUS FOR SERVICE GROUPING OF USERS TO DIFFERENT SPEED TIERS FOR WIRELESS COMMUNICATION

(71) Applicant: AT&T Intellectual Property I, L.P., Atlanta, GA (US)

(72) Inventors: Tony Wah-Tung Wong, Dallas, TX (US); Lujing Cai, Morganville, NJ (US); Abdellah Tazi, Redmond, WA (US); Stewart Barker, Lucas, TX (US); William Hurst, San Antonio, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/990,475

(22) Filed: May 25, 2018

(51) Int. Cl.
*H04M 15/00* (2006.01)
*H04W 72/10* (2009.01)
*H04W 4/24* (2018.01)

(52) U.S. Cl.
CPC ....... *H04M 15/8016* (2013.01); *H04M 15/61* (2013.01); *H04W 4/24* (2013.01); *H04W 72/10* (2013.01)

(58) Field of Classification Search
CPC ... H04W 4/24; H04W 72/10; H04M 15/8016; H04M 15/61
See application file for complete search history.

(56) References Cited

U.S. PATENT DOCUMENTS

| 6,560,459 | B1 | 5/2003 | Wong |
| 7,463,600 | B2 | 12/2008 | Tong et al. |
| 7,743,002 | B2 | 6/2010 | Hernandez |

(Continued)

FOREIGN PATENT DOCUMENTS

| CN | 101309204 B | 2/2015 |
| WO | 2012/075347 A1 | 6/2012 |

(Continued)

OTHER PUBLICATIONS

Tony. "The Optimal Antenna Beam Width for the LTE Deployment: Base Station Antenna from the 1G to 4G—History, Field Study, Simulation, Paradigm Change, and now perhaps Paradigm Change again?" LTE University—Expert Opinion. URL [http://lteuniversity.com/get_trained/expert_opinion1/b/twong/archive/2013/09/18/the-optimal-antenna-beam-width-for-the-lte-deployment-base-station-antenna-from-the-1g-to-4g-history-field-study-simulation-paradigm-change-and-now-perhaps-paradigm-change-again.aspx], dated Sep. 18, 2013, retrieved Mar. 19, 2019, 3 pages.

(Continued)

*Primary Examiner* — Wayne H Cai
(74) *Attorney, Agent, or Firm* — Amin, Turocy & Watson, LLP

(57) ABSTRACT

A speed tier based pricing scheme is utilized to increase average revenue per user (ARPU). To offer a speed tier based pricing scheme, the radio environment at a location of the UE can be analyzed to determine the speed tiers that can be offered to the user. In one aspect, an outer-loop scheduler can be utilized to allocate radio bearers to the UE based on a target data throughout associated with a user-selected speed tier. The priority of the non-guaranteed bit rate (GBR) bearers of the UE can be dynamically adjusted to track the target data throughput. In another aspect, a throttling func- (Continued)

tion can be implemented to limit the data throughput of the UE to the target data throughput.

20 Claims, 14 Drawing Sheets

(56) References Cited

U.S. PATENT DOCUMENTS

| | | | |
|---|---|---|---|
| 7,801,783 | B2 | 9/2010 | Kende et al. |
| 7,894,324 | B2 | 2/2011 | Laroia et al. |
| 8,005,726 | B1 | 8/2011 | Bao |
| 8,019,683 | B1 | 9/2011 | Swanburg et al. |
| 8,064,392 | B2 | 11/2011 | Chang et al. |
| 8,971,841 | B2 | 3/2015 | Menezes et al. |
| 8,976,887 | B2 | 3/2015 | Reingold |
| 9,124,436 | B2 | 9/2015 | Kashanian |
| 9,137,698 | B2 | 9/2015 | Li et al. |
| 9,154,225 | B2 | 10/2015 | Smith |
| 9,191,974 | B2 | 11/2015 | Chaudhuri et al. |
| 9,253,663 | B2 | 2/2016 | Raleigh et al. |
| 9,264,372 | B2 | 2/2016 | Stanwood et al. |
| 9,264,878 | B2 | 2/2016 | Young et al. |
| 9,432,522 | B2 | 8/2016 | Hutcheson et al. |
| 9,439,093 | B2 | 9/2016 | Chetlur et al. |
| 9,456,354 | B2 | 9/2016 | Branlund |
| 9,467,909 | B2 | 10/2016 | Faerber et al. |
| 9,565,697 | B2 | 2/2017 | Ameigeiras Gutierrez et al. |
| 9,603,047 | B2 | 3/2017 | Sridhar et al. |
| 9,621,248 | B2 | 4/2017 | Maltsev et al. |
| 9,647,918 | B2 | 5/2017 | Raleigh et al. |
| 9,667,805 | B2 | 5/2017 | Tapia |
| 9,775,050 | B1 | 9/2017 | Wang et al. |
| 9,781,738 | B2 | 10/2017 | Pietraski et al. |
| 9,794,825 | B2 | 10/2017 | Grinshpun et al. |
| 9,813,973 | B2 | 11/2017 | Ben et al. |
| 9,860,757 | B2 | 1/2018 | Udeshi et al. |
| 9,883,049 | B1 | 1/2018 | Warner |
| 9,924,045 | B1 | 3/2018 | Guha et al. |
| 10,075,985 | B2 | 9/2018 | Pawar et al. |
| 10,158,555 | B2 | 12/2018 | Ghosh et al. |
| 2003/0012138 | A1* | 1/2003 | Abdelilah .......... H04L 12/6418 370/231 |
| 2004/0259567 | A1 | 12/2004 | Valko et al. |
| 2004/0264371 | A1 | 12/2004 | Chen |
| 2005/0094605 | A1 | 5/2005 | Sun et al. |
| 2005/0254501 | A1 | 11/2005 | Laiho |
| 2006/0098670 | A1 | 5/2006 | Voit et al. |
| 2007/0178833 | A1 | 8/2007 | Wahlberg et al. |
| 2007/0229214 | A1* | 10/2007 | Meirick ................. H04L 47/14 340/2.23 |
| 2007/0275665 | A1 | 11/2007 | Molnar et al. |
| 2008/0062890 | A1 | 3/2008 | Temple |
| 2008/0233992 | A1 | 9/2008 | Oteri et al. |
| 2008/0299986 | A1 | 12/2008 | Lee |
| 2009/0240547 | A1 | 9/2009 | Fellenstein et al. |
| 2010/0273418 | A1 | 10/2010 | Eruchimovitch et al. |
| 2011/0249678 | A1 | 10/2011 | Bonicatto et al. |
| 2012/0027409 | A1 | 2/2012 | Agrawal et al. |
| 2012/0113937 | A1* | 5/2012 | Aramoto ............... H04W 8/082 370/329 |
| 2012/0176898 | A1* | 7/2012 | Ehsan .................... H04L 47/14 370/232 |
| 2013/0067082 | A1* | 3/2013 | Khan .................... G06Q 30/00 709/225 |
| 2013/0138956 | A1 | 5/2013 | Swist |
| 2013/0138976 | A1 | 5/2013 | Kim |
| 2013/0143553 | A1 | 6/2013 | Beattie, Jr. et al. |
| 2013/0218814 | A1 | 8/2013 | Kang et al. |
| 2013/0229953 | A1 | 9/2013 | Nam et al. |
| 2013/0321225 | A1 | 12/2013 | Pettus |
| 2014/0073337 | A1 | 3/2014 | Hong et al. |
| 2014/0087739 | A1 | 3/2014 | Weaver |
| 2014/0241174 | A1* | 8/2014 | Harris ................. H04L 43/0888 370/252 |
| 2014/0321282 | A1 | 10/2014 | Pragada et al. |
| 2015/0043337 | A1* | 2/2015 | Kanamarlapudi ........... H04W 72/1252 370/230 |
| 2015/0071248 | A1 | 3/2015 | Faerber et al. |
| 2015/0133131 | A1 | 5/2015 | Van Phan et al. |
| 2015/0222345 | A1 | 8/2015 | Chapman et al. |
| 2015/0230255 | A1 | 8/2015 | Lopes |
| 2015/0296499 | A1* | 10/2015 | Huang ................. H04W 72/048 370/329 |
| 2015/0325912 | A1 | 11/2015 | Liu |
| 2015/0341872 | A1 | 11/2015 | Ryu et al. |
| 2016/0020844 | A1 | 1/2016 | Hart et al. |
| 2016/0066261 | A1 | 3/2016 | Nasielski et al. |
| 2016/0086260 | A1 | 3/2016 | Vermeulen et al. |
| 2016/0269097 | A1 | 9/2016 | Islam et al. |
| 2017/0181134 | A1 | 6/2017 | Niu et al. |
| 2017/0230893 | A1 | 8/2017 | Miao et al. |
| 2017/0245192 | A1 | 8/2017 | Sadri et al. |
| 2017/0289837 | A1 | 10/2017 | Duo et al. |
| 2017/0303160 | A1 | 10/2017 | Poltorak et al. |
| 2017/0332282 | A1 | 11/2017 | Dao |
| 2018/0035301 | A1 | 2/2018 | Nama et al. |
| 2018/0042018 | A1 | 2/2018 | Bhushan et al. |
| 2018/0091278 | A1* | 3/2018 | Kanamarlapudi .... H04L 5/0055 |
| 2018/0092139 | A1 | 3/2018 | Novlan et al. |
| 2018/0192428 | A1 | 7/2018 | Doostnejad et al. |
| 2018/0194248 | A1 | 7/2018 | Doostnejad et al. |
| 2018/0198883 | A1* | 7/2018 | Vuornos ............. H04L 67/2828 |
| 2018/0220305 | A1 | 8/2018 | Lei |
| 2018/0242184 | A1 | 8/2018 | Yerramalli et al. |
| 2018/0242291 | A1 | 8/2018 | Moon et al. |
| 2018/0316481 | A1 | 11/2018 | Montojo et al. |
| 2018/0351809 | A1 | 12/2018 | Meredith et al. |
| 2018/0359746 | A1 | 12/2018 | Kim et al. |
| 2018/0359801 | A1 | 12/2018 | Kim et al. |
| 2018/0368114 | A1 | 12/2018 | Chen et al. |
| 2018/0368126 | A1 | 12/2018 | Islam et al. |

FOREIGN PATENT DOCUMENTS

| | | |
|---|---|---|
| WO | 2013058673 | 4/2013 |
| WO | 2013158237 | 10/2013 |
| WO | 2013/188629 A2 | 12/2013 |
| WO | 2015197537 | 12/2015 |
| WO | 2017/074362 A1 | 5/2017 |

OTHER PUBLICATIONS

Zhang et al., "Heterogeneous Statistical QoS Provisioning over 5G Mobile Wireless Networks", IEEE Network URL: http://www.ece.tamu.edu/~xizhang/papers/IEEE_Network_Journal_5G_Xi_Zhang.pdf, vol. 28, No. 6, Nov.-Dec. 2014, pp. 46-53.

Ferdosian et al., "Greedy-Knapsack Algorithm for Optimal Downlink Resource Allocation in LTE Networks", Wireless Networks URL: https://arxiv.org/pdf/1601.03461.pdf, vol. 22, No. 5, 2016, 15 pages.

Anthony et al., "Data plan throttling: A Simple Consumer Choice Mechanism", 2013 IEEE Global Communications Conference (GLOBECOM), DOI: 10.1109/GLOCOM.2013.6831556, Atlanta, USA, URL: https://suscholar.southwestern.edu/bitstream/handle/11214/125/DataPlanThrottling.pdf?sequence=1&isAllowed=y, Dec. 9-13, 2013, 6 pages.

Cisco, "Use Case: Speed Tiers Data Plan", At-A-Glance, URL:https://www.cisco.com/c/dam/en/us/solutions/collateral/service-provider/mobile-internet-applications-services/at-a-glance-c45-731340.pdf, Jul. 2014, 2 pages.

Dehos, et al. "Millimeter-wave access and backhauling: the solution to the exponential data traffic increase in 5G mobile communications systems?" IEEE Communications Magazine • Sep. 2014, 8 pages.

Taori, et al. "Point-to-multipoint in-band mmwave backhaul for 5G networks" IEEE Communications Magazine • Jan. 2015, 7 pages.

Mueck, et al. "Spectrum sharing: Licensed shared access (lsa) and spectrum access system (sas)" Intel White Paper, Oct. 2015, 27 pages.

(56) References Cited

OTHER PUBLICATIONS

Gao, et al. "MmWave massive-MIMO-based wireless backhaul for the 5G ultra-dense network" arXIV:1508.03940v3, Nov. 27, 2015. 7 pages.
Hur, et al. "Millimeter wave beamforming for wireless backhaul and access in small cell networks" IEEE Transactions on Communications, vol. 61, No. 10, Oct. 2013, 13 pages.
Office Action dated Dec. 10, 2018 for U.S. Appl. No. 16/030,531, 45 pages.
Office Action dated Jan. 22, 2019 for U.S. Appl. No. 16/010,332, 41 pages.
Final Office Action received for U.S. Appl. No. 16/030,531 dated Jun. 28, 2019, 56 pages.
Notice of Allowance for U.S. Appl. No. 16/010,332 dated May 7, 2019, 45 pages.

\* cited by examiner ated with a user equipment (UE).

SYSTEM, METHOD, AND APPARATUS FOR SERVICE GROUPING OF USERS TO DIFFERENT SPEED TIERS FOR WIRELESS COMMUNICATION

TECHNICAL FIELD

The subject disclosure relates to wireless services, e.g., a system, method, apparatus, etc. for service grouping of users to different speed tiers for wireless communication.

BACKGROUND

With growth in communication services, network service providers continue to increase the services (e.g., voice and/or data) that are to be delivered to subscribers. Typically, subscribers can avail the services by purchasing subscriptions and/or service plans from the network service providers. Conventionally, wireless communication services are offered to the subscriber based on a monthly usage rate. Typically, a user pays a basic flat rate monthly fee for a basic level of the service. Users that expect to use more than the basic level of data, or require a higher quality-of-service, can subscribe to higher level plans. For example, a user can pay $X per month for a 150 GB package, $Y per month for a 250 GB package, $Z per month for a 400 GB package and so on and so forth (e.g., wherein X<Y<Z).

Third generation partnership project (3GPP) supports these usage-based tiers by applying quality of service (QoS) at a bearer level, between a packet data network gateway (PGW) and an eNodeB. For example, guaranteed bit rate (GBR) and non-GBR bearers are set up by the PGW based on a quality of service class indicator (QCI). However, the PGW can only manage the individual bearer data throughput.

DETAILED DESCRIPTION

Figure 1:
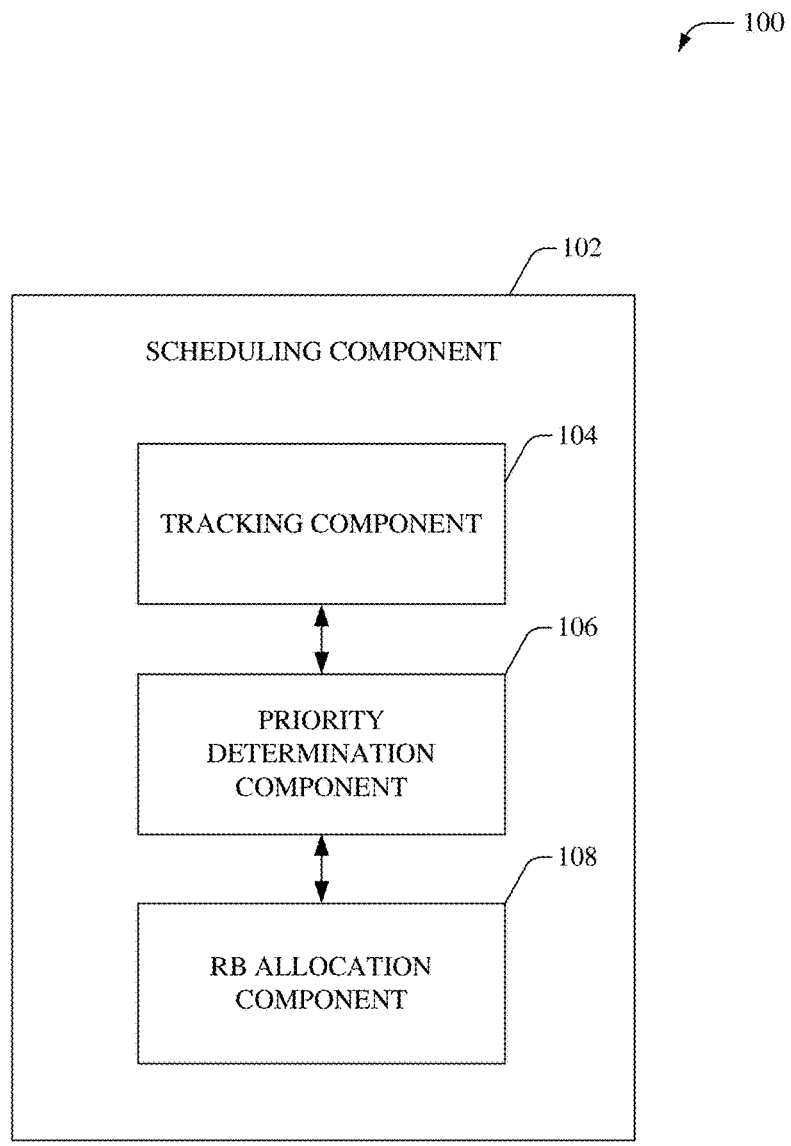
FIG. 1 illustrates an example system that facilitates scheduling of the allocation of resource blocks (RBs) based on speed-tier data.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," "point," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," "customer," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth. Further, it is noted that the term "upstream" as used herein refers to a direction in which data sent for a "stream" flowing from a user equipment to a network service provider device (or content provider device or application provider device). As an example, if a first device is closer to (fewer hops away from) the network service provider device than a second device, then the first device is said to be upstream from the second device or conversely, the second device is downstream from the first device.

It should be noted that although various aspects and embodiments have been described herein in the context of fixed wireless and/or nomadic networks, the disclosed aspects are not that limited and can be applied to other wireless communication technologies, including, but not limited to 4G and/or future wireless technologies (e.g., to provide internet of things (IoT) connectivity). As an example, the wireless communication technologies can also include universal mobile telecommunications system (UMTS), code division multiple access (CDMA), Wi-Fi, worldwide interoperability for microwave access (WiMAX), general packet radio service (GPRS), enhanced GPRS, third generation partnership project (3GPP), LTE, third generation partnership project 2 (3GPP2) ultra mobile broadband (UMB), high speed packet access (HSPA), evolved high speed packet access (HSPA+), high-speed downlink packet access (HSDPA), high-speed uplink packet access (HSUPA), Zigbee, or another IEEE 802.XX technology. Additionally, substantially all aspects disclosed herein can be exploited in fifth generation (5G) and/or other next generation networks and/or legacy telecommunication technologies.

Conventionally, service providers have offered wireless services to subscribers based on a fixed data usage fee. For example, a flat fee is charged for a specified amount of data usage, for example, per month. However, the speed of the data delivery has never been a determining factor for billing. The systems and methods disclosed in one or more embodiments herein, enable service providers to offer wireless services to subscribers at different speed tiers. For example, subscribers can pay an additional fee to be upgraded to a faster speed tier (e.g., that target to receive at a higher data rate). In one aspect, an analysis of a radio environment at a location of a user equipment (UE) allows to set up tiers of target data rate for the UE within a sector (e.g., across multiple carriers if/when carrier aggregation is in place, or in a dual connectivity (DC) deployment scenario, where the subscriber can be connected to the communication network across frequency bands and/or different communication technologies). Accordingly, the average revenue per user (ARPU) can be significantly increased from that conventional systems.

Referring initially to FIG. 1, there illustrated is an example system 100 that facilitates scheduling of allocation of resource blocks (RBs; also referred to herein as physical resource blocks (PRBs)) based on speed-tier data, according to one or more aspects of the disclosed subject matter. In an aspect, a scheduling component 102 can be utilized to intelligently allocate the one or more RBs based on data throughput rates that are defined as part of a service agreement between a user and a service provider. To allow a speed-based pricing scheme, the scheduling component 102 facilitates grouping the users to different tiers of target throughput to enable a differential pricing scheme and increase ARPU. As an example, the scheduling component 102 can be part of an access network device, for example, an access point (e.g. eNodeB (eNB)). In one embodiment, the access network device can be deployed within a fixed and/or nomadic wireless network.

3GPP specifications have standardized a quality of service class indicator (QCI) architecture that is based on the fundamental concept of a bearer, which is assigned to a predefined QCI. Typically, a packet data network gateway (PGW) can be utilized to classify a set of bearers. A bearer is a traffic separation element that enables differentiated treatment of traffic based on its QCI requirements, and provides a logical path between UE and a gateway. Traffic flows that are mapped to a single bearer receive the same packet-forwarding treatment (e.g. scheduling, queue management, rate shaping, link layer configuration, etc.) between the UE and the gateway. Bearers can be classified based on their QCI requirements as a default or a dedicated bearer. A default bearer is assigned to a user equipment (UE), when the UE first couples to the network (e.g., established at a new Packet Data Network (PDN) connection) and is associated with the UE's IP address. The default bearer does not have a bit rate guarantee and offers only best-effort service. In contrast, a dedicated bearer provides a dedicated tunnel to give appropriate treatment to specific services. The dedicated bearer can be further classified as a guaranteed bit rate (GBR) bearer or a non-GBR bearer. The GBR bearer has dedicated network resources that are typically required for real-time services, such as, but not limited to, real-time voice, gaming, and/or video services. The non-GBR bearer is a best-effort type bearer and its bandwidth is not guaranteed and can be utilized for non-real-time services, such as, but not limited to, content download. As an example, the QCI is a scalar that is used within the access network as a reference to node specific parameters that control packet forwarding treatment, for example scheduling weight, admission thresholds and link-layer protocol configuration. Typically, the PGW can set up the bearers based on the QCI and a traffic profile of a UE. However, traditional PGWs can only manage the individual bearer data throughput and do not segment subscribers and/or UEs to tiers of aggregated data rates. In contrast, system 100 can be utilized to schedule RBs based on the tiers of aggregated data rates and manage data rates at a UE level.

For a lightly-loaded network (e.g., network load is below a defined threshold), the data throughput for the users can be restricted to a value defined based on the user's subscription and/or fees charged to the user. For example, if a subscriber pays for 25 Mbps, even though resources are available, the throughput to the subscriber's device is limited to 25 Mbps+ margin of throughput. In conventional systems, when the network gets congested (e.g., network load is above the defined threshold and/or demand for resources is greater than the available RBs), the non-GBR bearers of the same QCI for the users utilize a "best effort" scheme that does not prioritize specific users and/or a class of users. In contrast, system 100 prioritizes the non-GBR bearers of the same QCI based on speed-tier subscriptions of the users. For example, first users that have subscribed to a higher speed tier can be assigned a higher priority than that assigned to second users that have a lower speed tier, if each class has not met the target throughput associated with the speed tiers. Further, if the first users have met the target data throughput associated with the higher speed tier, a higher priority can be given to the next class of users that has not meet its target throughput.

According to an embodiment, a tracking component 104 can be utilized to monitor the data throughput associated with one or more active UEs (e.g., subscriber accounts associated with the UEs) within a defined interval (e.g., 50 ms). As an example, the data throughput can be received from a core network device (not shown). A priority determination component 106 can be utilized to determine a priority for non-GBR bearers associated with the UEs. Moreover, not all non-GBR bearers of the same QCI are assigned the same priority for all users (and/or UEs). As discussed above, in congested networks, if the data throughput of a first user (e.g., subscriber account associated with one of the active UEs), assigned to a higher speed tier, is determined to be below a targeted data rate (e.g., of the higher speed tier), the non-GBR bearer(s) for the user are assigned a higher priority than the non-GBR bearer(s) of a common QCI associated with second users that are assigned to lower speed tiers. Further, if the data throughput of the first user is at the targeted data rate, the non-GBR bearer(s) for the user are assigned a lower priority than the non-GBR bearer(s) of a common QCI associated with the second users that remain to be below the data rate (e.g., not yet meeting their target data rate). It is noted that the target data rate for a speed tier comprises the total data rate provided via all the established bearers, including the GBR bears and non-GBR bearers, for a specific UE within that speed tier.

As an example, the speed-tier assignment information can be received from, a network data store (e.g., home subscriber store (HSS)). In an aspect, a RB allocation component 108 can allocate RBs to the UEs per transmission time interval (TTI).

Figure 2:
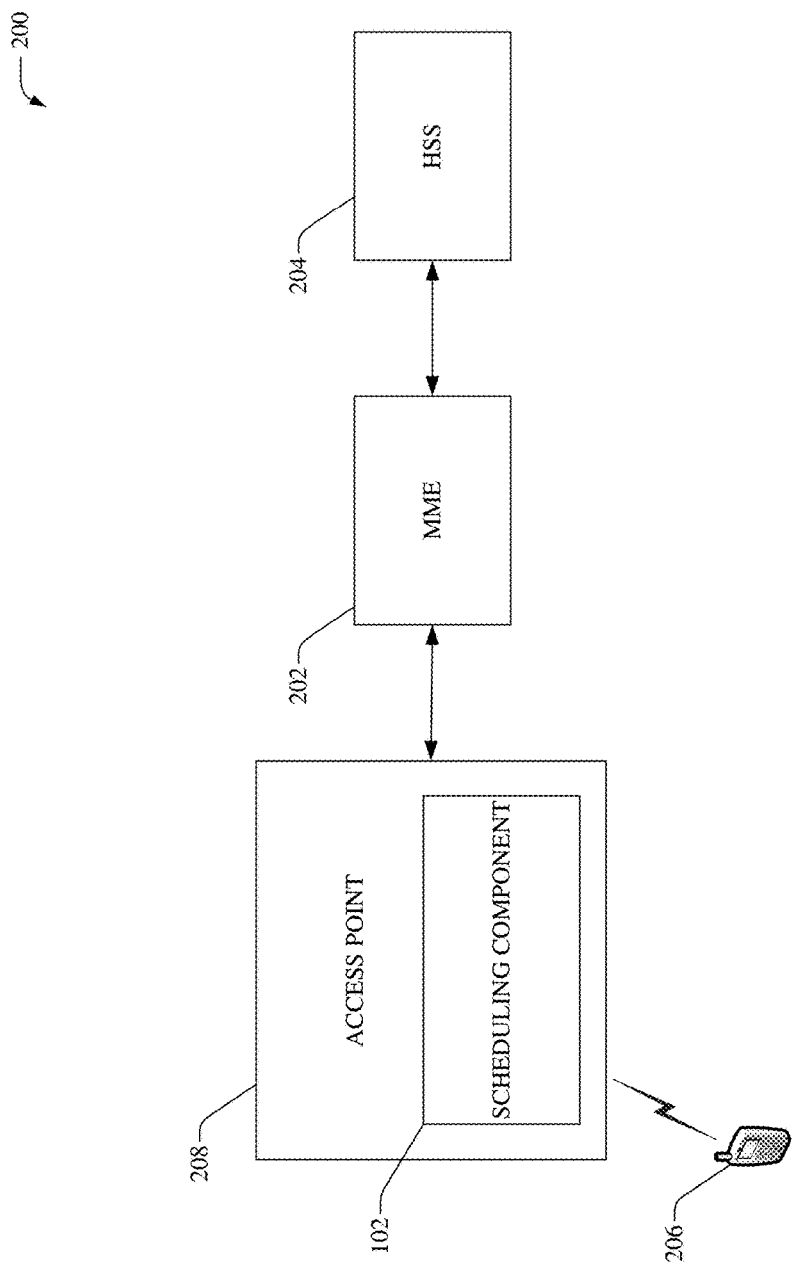
FIG. 2 illustrates an example system that receives speed-tier data associated with a user equipment (UE).

Referring now to FIG. 2, there illustrated is an example system 200 that receives speed-tier data associated with a UE, in accordance with an aspect of the subject disclosure. It is noted that the scheduling component 102 can comprise functionality as more fully described herein, for example, as described above with regards to system 100.

Among other functions, MME 202 can perform idle mode UE paging and/or tagging procedures. Additionally, the MME 202 can facilitate a bearer activation/deactivation process and can be utilized to select a serving gateway (SGW) for a UE at the initial attach and/or handovers. Further, the MME 202 can communicate with a network data store, for example, HSS 204 to authenticate the user/UE 206 served by access point 208 (e.g., eNB). After the authentication procedure, the MME 202 can query the HSS 204 for subscriber information associated with the UE 206 (e.g., as part of a default bearer setup request). As an example, the query can be an update location request that can comprise a UE identifier (e.g., an international mobile subscriber identity (IMSI) of UE 206), a public land mobile network (PLMN) identifier, radio access technology (RAT) type, etc. In response, the HSS 204 can transmit to the MME 202, an update location answer that can comprise the subscriber information. In an aspect, the subscriber information can comprise access point name (APN) configurations, such as, but not limited to, a PDN type, a default bearer QoS, visited PLMN (VPLMN) dynamic, address allocation allowed, charging characteristics and speed-tier information. Moreover, the speed-tier information specifies a target DL/UL aggregated data rate (+margin) assigned to the UE 206 in accordance with a service agreement. The target DL/UL aggregated data rate can be utilized to set the APN aggregate maximum bit rate (AMBR) for non-GBR bearers.

In one aspect, the MME 202 can store speed-tier information and associate it with a globally unique temporary identifier (GUTI) of the UE 206. Further, the speed-tier information can be transmitted from the MME 202 to the access point 208 via a S1-MME interface. According to an embodiment, the scheduling component 102 can associate the cell radio network temporary identifier (C-RNTI) with the specified speed tier when the UE 206 is in a radio resource control (RRC)-connected mode. When the UE 206 is in RRC-connected and/or active mode, the scheduling component 102 can prioritize and assign physical resource blocks (PRB) (e.g., by employing the priority determination component 106 and the RB allocation component 108).

Typically, UEs (e.g., UE 206) that are within a next generation fixed wireless (NGFW) network and/or a nomadic network have different attributes than UEs that are within a truly mobile network. For example, the NGFW UEs are stationary and thus, their radio environment could be with less variant over time. In one aspect, a channel quality indicator (CQI) for these UEs can be more stable and predictive than the CQI for mobile UEs. The stability and accurate predictability of the CQI allows the scheduling component 102 to be more effective for RB allocation over a period of hundreds of frames to meet the UE's target speed-tier setting.

As an example, Table 1 illustrates an example estimation of user data throughput for the assignment of 1 PRB across one frame (10 subframes) in the LTE standard on the DL with a 4×4 multiple input multiple output (MIMO) based on CQI. It is noted that the UL will follow a similar derivation.

TABLE 1

| CQI | Modulation | Coding Rate × 1024 | Effective bits per symbol | # of user-data carrying symbol per PRB per tti | User-data carrying bits per PRB per tti | Data throughput (TP) (Mbps) per PRB per 10 ms frame (1) | Average DL Data TP (Mbps) per type of modulation scheme per 10 ms frame (w/ 1 stream) | Average DL Data TP (Mbps) per type of modulation scheme per 10 ms frame (w/ 4 streams) |
|---|---|---|---|---|---|---|---|---|
| 0 | | | | Out of Range | | | | |
| 1 | QPSK | 78 | 0.1523 | 128 | 19.494 | 0.014621 | 0.045002 | 0.180006 |
| 2 | QPSK | 193 | 0.3770 | 128 | 48.256 | 0.036192 | | |

TABLE 1-continued

| CQI | Modulation | Coding Rate × 1024 | Effective bits per symbol | # of user-data carrying symbol per PRB per tti | User-data carrying bits per PRB per tti | Data throughput (TP) (Mbps) per PRB per 10 ms frame (1) | Average DL Data TP (Mbps) per type of modulation scheme per 10 ms frame (w/ 1 stream) | Average DL Data TP (Mbps) per type of modulation scheme per 10 ms frame (w/ 4 streams) |
|---|---|---|---|---|---|---|---|---|
| 3 | QPSK | 449 | 0.8770 | 128 | 112.256 | 0.084192 | | |
| 4 | 16 QAM | 378 | 1.4766 | 128 | 189.005 | 0.141754 | 0.185504 | 0.742016 |
| 5 | 16 QAM | 490 | 1.9141 | 128 | 245.005 | 0.183754 | | |
| 6 | 16 QAM | 616 | 2.4063 | 128 | 308.006 | 0.231005 | | |
| 7 | 64 QAM | 466 | 2.7305 | 128 | 349.504 | 0.262128 | 0.376199 | 1.504796 |
| 8 | 64 QAM | 567 | 3.3223 | 128 | 425.254 | 0.318941 | | |
| 9 | 64 QAM | 666 | 3.9023 | 128 | 499.494 | 0.374621 | | |
| 10 | 64 QAM | 772 | 4.5234 | 128 | 578.995 | 0.434246 | | |
| 11 | 64 QAM | 873 | 5.1152 | 128 | 654.746 | 0.491059 | | |
| 12 | 256 QAM | 711 | 5.5547 | 128 | 711.002 | 0.533251 | 0.626441 | 2.505763 |
| 13 | 256 QAM | 797 | 6.2266 | 128 | 797.005 | 0.597754 | | |
| 14 | 256 QAM | 885 | 6.9141 | 128 | 885.005 | 0.663754 | | |
| 15 | 256 QAM | 948 | 7.4063 | 128 | 948.006 | 0.711005 | | |

Based on the CQI of the UE's location, the access point 208 can bin historical data throughput with the CQI and the rank indicator (RI) of the RRC-connected users. The scheduling component 102 can tightly manage the PRB assignment of upcoming frames to track the data rate of the UE 206 to its target speed tier.

According to an aspect, when the UE 206 is no longer in the RRC-connected mode, the scheduling component 102 can discard the C-RNTI from a queue. When the UE 206 transitions back from the RRC-idle mode to the RRC-connected mode (e.g., via a random access (RA) procedure), the MME 202 can associate the user profile based on its GUTI and provide the speed-tier information to the access point 208, which in turn can associate the C-RNTI to the target speed tier of the UE 206. In one aspect, the scheduling component 102 can bin the DL/UL data rate based on the CQI and/or RI. As an example, the scheduling component 102 can compare this key performance indicator (KPI) to the speed-tier target data rate and if needed, can assign more PRB to the UE 206 to track the target data rate.

It is noted that in one or more example embodiments, the control plane devices, for example, MME 202 and/or HSS 206, can comprise a virtual network device. For example, virtual networks can implement functions of infrastructure nodes in software on commercial "off-the-shelf" computing equipment. Virtualization can decrease capital and/or operating costs, reduce time for deployment of new services, improve energy savings, and/or enhance network efficiency. In one or more example embodiments, the architecture disclosed in system 100 facilitates application of network functions virtualization (NFV) and/or software-defined networking (SDN) technologies. NFV can virtualize network services that have been conventionally carried out by proprietary, dedicated hardware/software and instead host the network services on one or more virtual machines (VMs). Using NFV, network service providers do not need to purchase proprietary/dedicated hardware devices to enable a service. NFV can improve scalability and flexibility and network capacity can easily be adjusted through software, resulting in reduced capital expenses and/or operating expenses. NFV and SDN are different technologies but complementary. SDN architectures decouple or disassociate network control (e.g., control plane) and forwarding (e.g., data plane) functions. This allows for dynamic, programmable, and/or scalable computing and storage. The SDN architecture can be at least (i) directly programmable; (ii) agile; (iii) centrally managed; (iv) programmatically configured; and/or (v) open standards-based and vendor-neutral.

Figure 3:
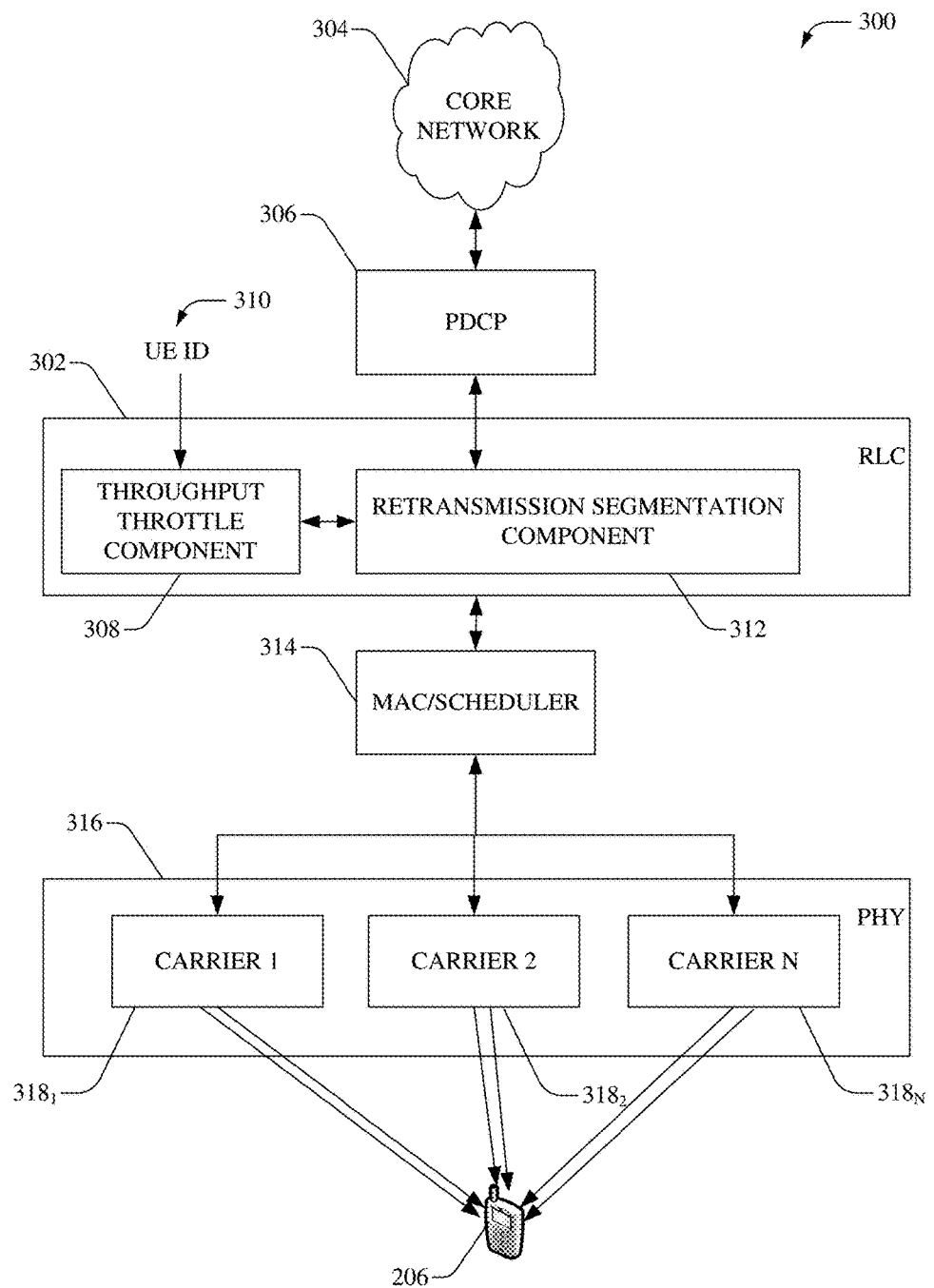
FIG. 3 illustrates an example system that manages data throughput within a radio link control (RLC) layer.

Referring now to FIG. 3, there illustrated is an example system 300 that manages data throughput within a radio link control (RLC) layer 302, in accordance with an aspect of the subject disclosure. It is noted that the UE 206 can comprise functionality as more fully described herein, for example, as described above with regards to system 200.

In one aspect, the RLC layer 302 receives data from the core network 304 via a packet data convergence control (PDCP) layer. Among other functions, the PDCP layer can perform header compression and decompression of IP data, transfer of data (user plane and/or control plane data), maintenance of PDCP Sequence Numbers (SNs), in-sequence delivery of upper layer protocol data units (PDUs) at re-establishment of lower layers, duplicate elimination of lower layer service data units (SDUs) at re-establishment of lower layers for radio bearers mapped on RLC acknowledged mode (AM), ciphering and deciphering of user plane data and/or control plane data, integrity protection and integrity verification of control plane data, timer based discard, duplicate discarding, etc. Typically, the RLC layer 302 can operate in three modes of operation: transparent mode (TM), unacknowledged mode (UM), and acknowledged mode (AM). Among other functions, the RLC layer 302 can perform functions, such as, but not limited to, transferring upper layer PDUs, error correction through automatic repeat request (ARQ) for AM data transfers, concatenation, segmentation and reassembly of RLC SDUs for UM and AM data transfers. In addition, the RLC layer 302 can perform re-segmentation of RLC data PDUs for AM data transfers, reordering of RLC data PDUs for UM and AM data transfers, duplicate detection for UM and AM data transfers, RLC SDU discard for UM and AM data transfers, RLC re-establishment, and protocol error detection for AM data transfers.

According to an embodiment, the RLC layer 302 can comprise a throughput throttle component 308 that can manage data throughput for a specific UE (e.g., UE 206) to provide a consistent user experience. As an example, the throughput throttle component 308 can receive UE ID 310 (e.g., C-RNTI, IMSI, etc.) and determine a speed tier associated with the UE 206 (e.g., based on subscriber information, for example, stored within the HSS). Moreover, regardless of the available RBs, the data throughput for the UE 206 can be capped at a target throughput defined by the speed tier. If the throughput throttle component 308 determines that the target throughput has not been met, the throughput throttle component 308 can increase the data throughput for the UE 206. Alternatively, if the throughput throttle component 308 determines that the target throughput has been met (and/or exceeded), the throughput throttle component 308 can decrease the data throughput for the UE 206.

In one aspect, the throughput throttling can be performed by allocating different buffer size in the RLC according to UE speed-tier requirement. For example, lower speed tiers can have larger buffers, while higher speed tiers can have smaller buffers. In yet another aspect, the throughput throttling can be performed by monitoring the throughput rate passing through the RLC layer 302 for the UE 206 and if determined that the rate is higher than the target data rate, the movement of data can be temporarily halted.

In yet another aspect, the throughput throttling can be performed by controlling the segmentation size. Typically, a retransmission segmentation component 312 can split larger chunks (RLC SDUs) into smaller segments of a defined size. Moreover, the throughput throttle component 308 can adjust the size of segments to adjust the data rate. As an example, if the data rate is determined to be reduced (e.g., by the throughput throttle component 308), the size can be reduced to generate smaller transport blocks and a RLC SDU can be split among several RLC PDUs. Alternatively, if the data rate is determined to be increased (e.g., by the throughput throttle component 308), the size can be increased to generate larger transport blocks and several RLC SDUs can be packed into a single RLC PDU. The RLC layer 302 can transfer the RLC PDUs (MAC SDUs) to a medium access layer (MAC)/scheduler 314.

The MAC/scheduler 314 can perform a mapping between logical channels and transport channels. As an example, the MAC/scheduler 314 can add header information and perform padding to fit the MAC SDU in a transmission time interval (TTI). Further, the MAC/scheduler 314 can transfer MAC PDU to a physical layer 316, which in turn can transmit the data into slots of sub frame via one or more carriers 1-N $318_1$-$318_N$ (wherein N is most any integer).

In one aspect, the system 300 can provide various non-limiting advantages, for example, (i) the throttling is agnostic/independent of the physical layer L1 implementation (e.g., carrier aggregation, MIMO order, duplex mode (e.g., time division duplex (TDD) and/or frequency division duplex (FDD)), etc.; (ii) the throttling is independent of the radio conditions (e.g., between an access point and the UE 206); (iii) and the throttling does not impact the existing eNB scheduler, which is already optimized for maximum network capacity under given radio conditions; etc.

Figure 4A:
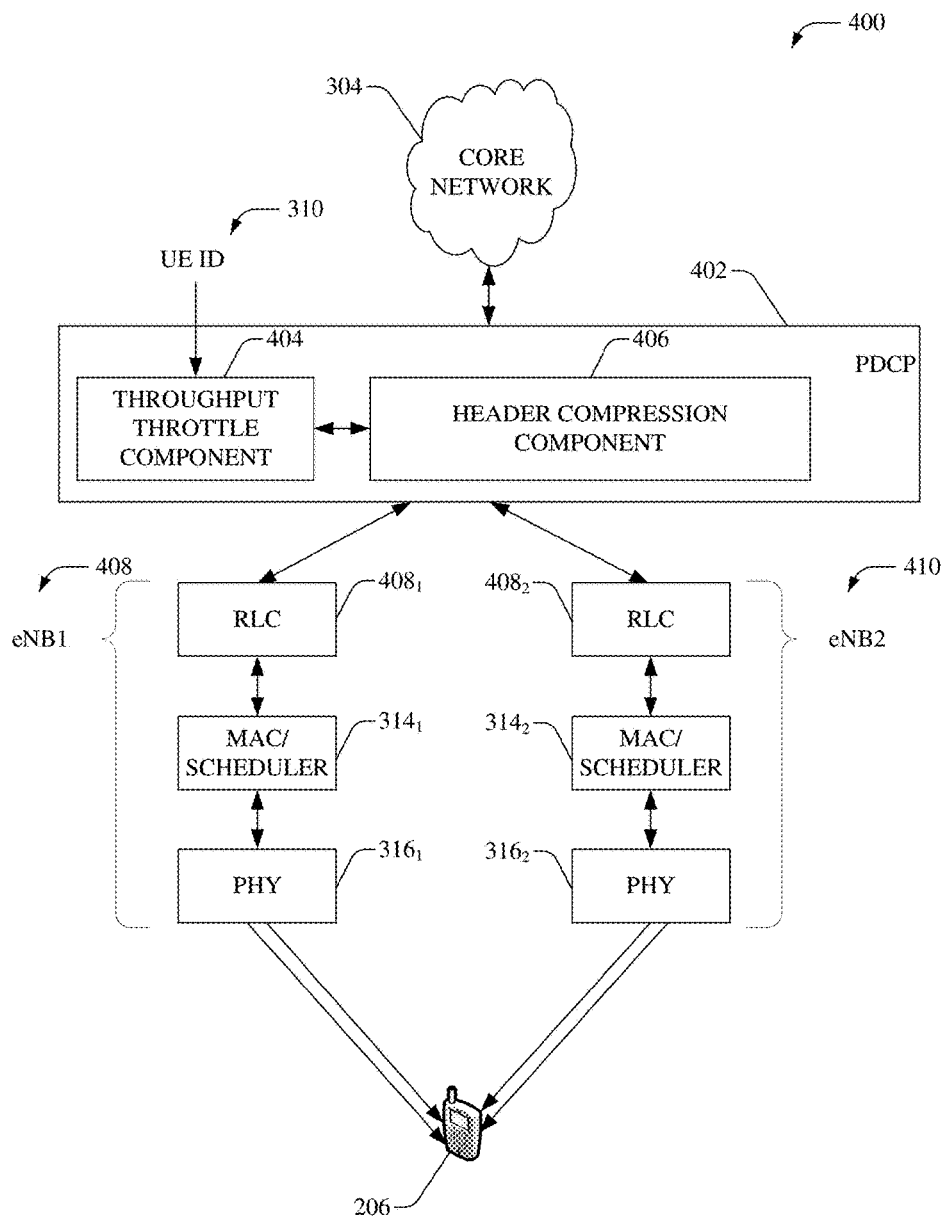
FIGS. 4A and 4B illustrate example systems that implement data throughput throttling in higher stack layers.
Figure 4B:
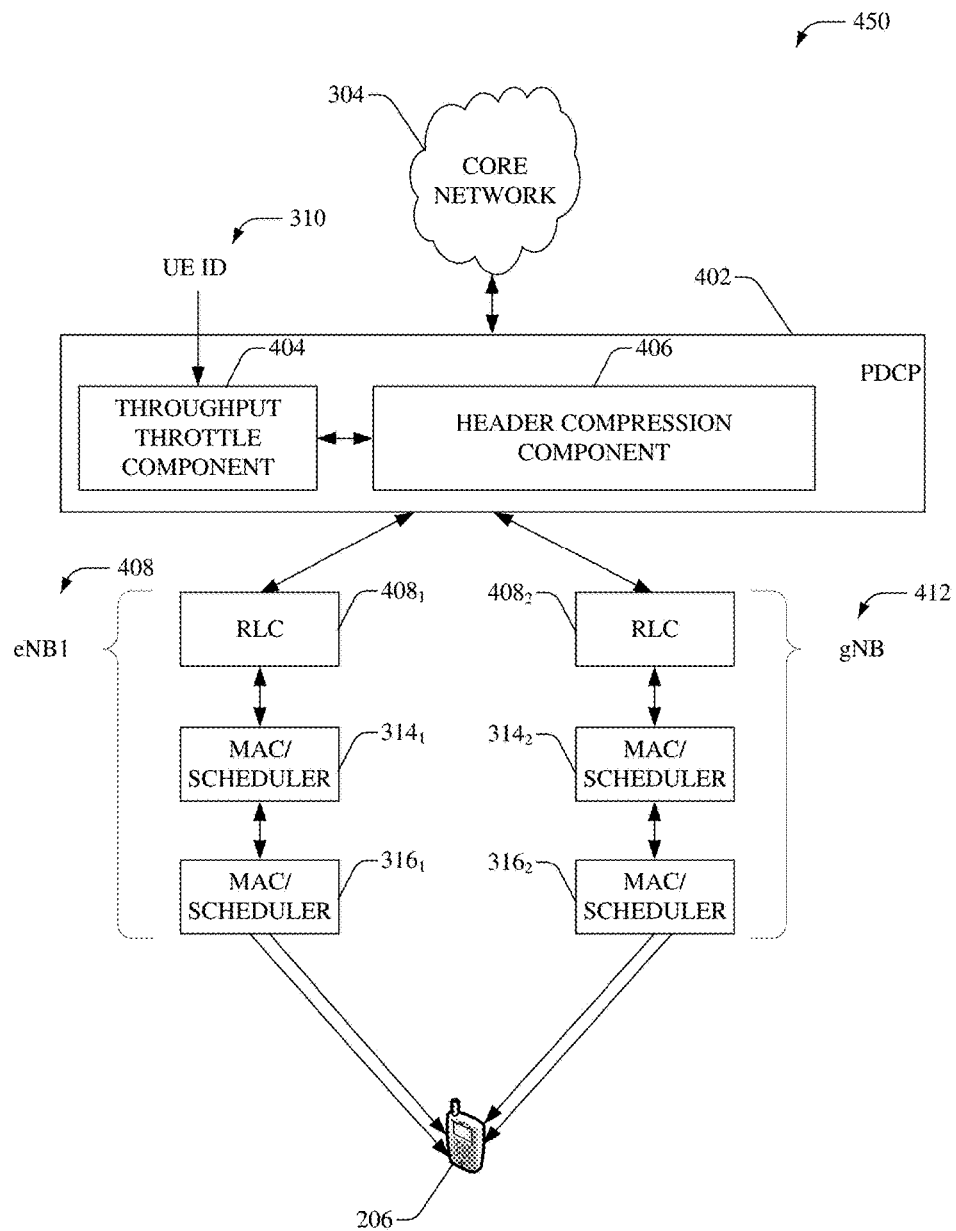

Referring now to FIGS. 4A and 4B, there illustrated are example systems 400-450 that implement data throughput throttling in higher stack layers, according to an aspect of the subject disclosure. It is noted that the core network 304 and UE 206 can comprise functionality as more fully described herein, for example, as described above with regards to systems 200-300. Further, the MAC/scheduler $314_1$-$314_2$ can be substantially similar to the MAC/scheduler 314 and can comprise functionality as more fully described herein, for example, as described above with regards to the MAC/scheduler 314. Furthermore, the physical layers $316_1$-$316_2$ can be substantially similar to the physical layer 316 and can comprise functionality as more fully described herein, for example, as described above with regards to the physical layer 316.

In one aspect, a PDCP layer 402 can comprise a throughput throttle component 404 that can control the data throughput for a specific UE (e.g., UE 206) to provide a consistent user experience. As an example, the throughput throttle component 404 can receive UE ID 310 (e.g., C-RNTI, IMSI, etc.) and determine a speed tier associated with the UE 206 (e.g., based on subscriber information, for example, stored within the HSS). Moreover, regardless of the available RBs, the data throughput for the UE 206 can be restricted to a target throughput defined by the speed tier. If the throughput throttle component 404 determines that the target throughput has not been met, the throughput throttle component 404 can increase the data throughput for the UE 206. Alternatively, if the throughput throttle component 404 determines that the target throughput has been met (and/or exceeded), the throughput throttle component 404 can decrease the data throughput for the UE 206. It is noted that the throughput throttle component 404 can be substantially similar to the throughput throttle component 308 and can comprise functionality as more fully described herein, for example, as described above with regards to the throughput throttle component 308.

Among other functions, the PDCP layer 402 can perform header compression, for example, via a header compression component 406. As an example, the header compression component 406 can utilize IP header compression (e.g., RFC 2507) or robust header compression (e.g., RFC 3095) to perform the header compression.

FIG. 4A depicts data throughput throttling in a PDCP layer of a LTE Advanced Pro network. In this example system, UE 206 can employ dual connectivity to communicate via multiple access points, for example, eNB1 408 and eNB2 410. In one aspect, eNB1 408 and eNB2 410 can be part of a heterogeneous network, wherein eNB1 408 can be a macro access point and eNB2 410 can be a small cell (e.g., femtocell, pico cell, etc.) access point (or vice versa). Dual connectivity allows the UE 206 to receive data simultaneously (or substantially simultaneously) from eNB1 408 and eNB2 410 and can thus, increase the performance in a heterogeneous network with dedicated carrier deployment. In one example, eNB1 408 and eNB2 410 can communicative via different frequency bands (e.g., citizens broadband radio service (CBRS), millimeter wave (mmWave), etc.). In another example, eNB1 408 and eNB2 410 can be in compliance with different technologies, and/or different releases of 3GPP (e.g., eNB1 408 is in compliance with 3GPP Rel.14, and eNB2 410 is in compliance with Rel.15). Since different carrier frequencies are utilized by eNB1 408 and eNB2 410, the UE 206 can run two MAC entities, for example, UE 206 can utilize radio resources provided by two distinct schedulers (e.g., MAC/schedulers $314_1$-$314_2$) and can support two UL carriers.

FIG. 4B depicts data throughput throttling in a PDCP layer of a non-standalone (NSA) new radio (NR) network. NSA NR can utilize existing LTE radio and core network as an anchor for mobility management and coverage (e.g., via eNB 408) while adding a new carrier (e.g., a 5G carrier) via a next generation access point, gNB 412.

Figure 5:
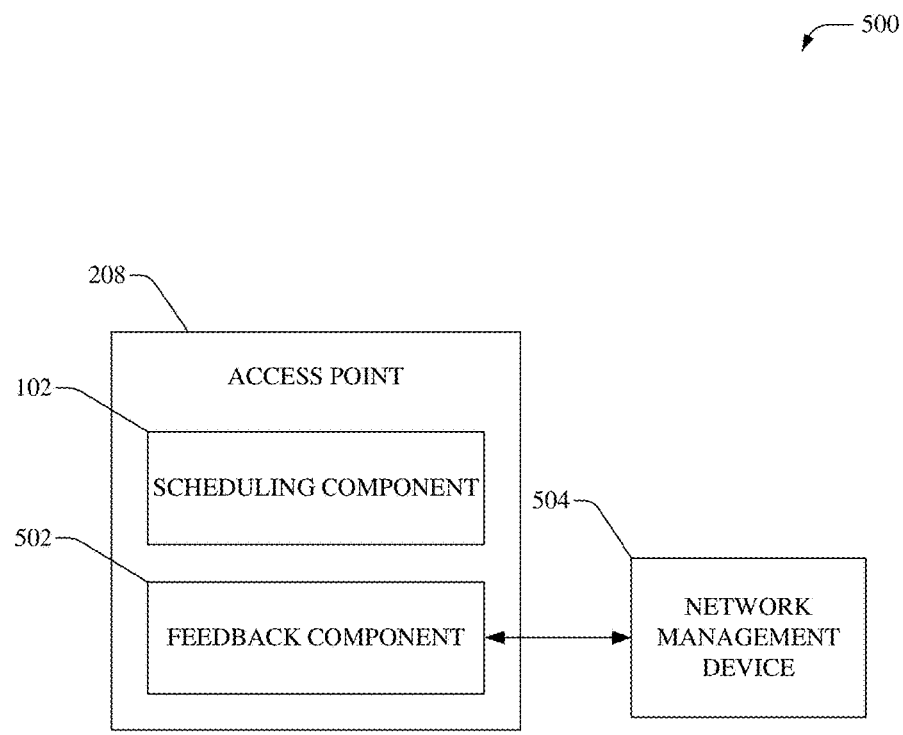
FIG. 5 illustrates an example system that provides physical resource block (PRB) utilization feedback.

Referring now to FIG. 5, there illustrated is an example system 500 for providing PRB utilization feedback. It is noted that the access point 208 and the scheduling component 102 can comprise functionality as more fully described herein, for example, as described above with regards to systems 100-200. In one aspect, the access point 208 can monitor its PRB utilization of GBR bearers for all UEs served by the access point 208, for example, periodically, over a defined time period, in response to an event, on-demand, during an idle period, etc. If determined that the PRB utilization satisfies a defined criterion (e.g., exceeds a defined threshold), a feedback component 502 can be utilized to generate and transmit a report and/or alert to a network management device 504. In an aspect, the network management device 504 can aggregate and analyze reports (and/or alerts) received from one or more access points (e.g., access point 208) to facilitate network planning. As an example, new access points can be deployed in areas where the access points have consistently reported high PRB utilization (e.g., more than 70%).

Figure 6:
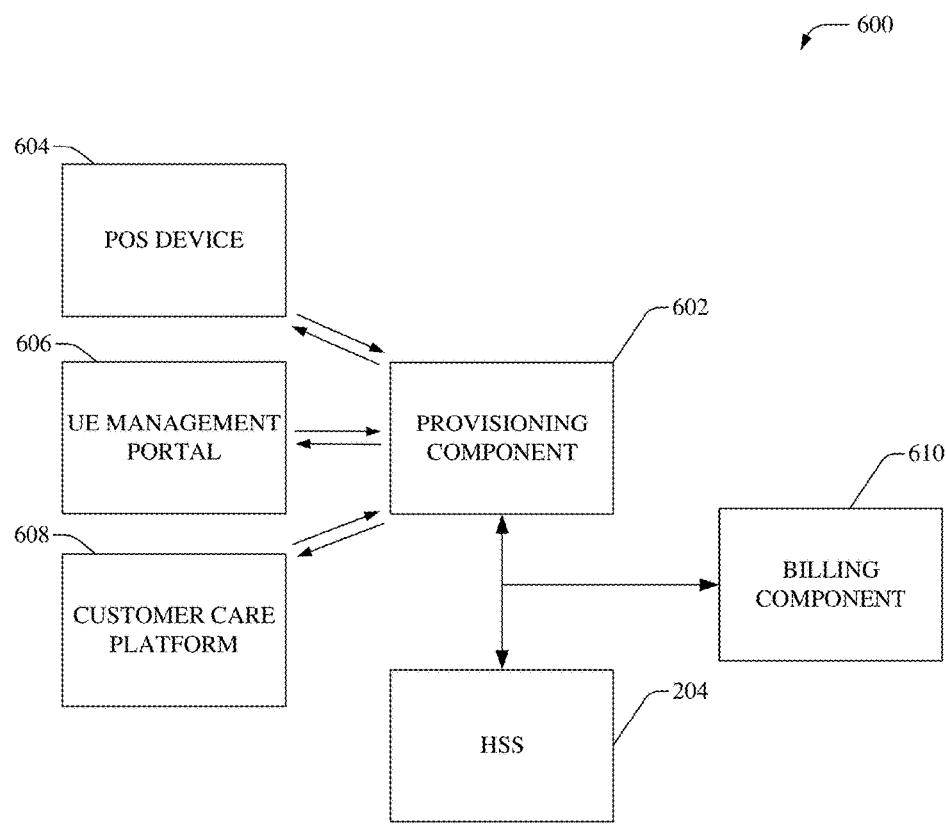
FIG. 6 illustrates an example system that facilitates billing subscribers at different speed-tier levels.

FIG. 6 illustrates and example system 600 that facilitates billing subscribers at different speed-tier levels. It is noted that scheduling component 102 and access point 208 can comprise functionality as more fully described herein, for example, as described above with regards to systems 100-200. In one aspect, a provisioning component 602 can be utilized to group subscribers to different speed tiers as part of a service agreement. Moreover, the service provider can offer wireless service to the subscribers based on the different speed tiers. For example, a higher fee can be charged for faster speeds.

A request to set up a new (and/or update an existing) service agreement can be received by the provisioning component 602 from a point of sale device 604, a UE management portal 606, and/or a customer care platform 608. In one aspect, for fixed and/or nomadic UEs, a location and/or area (e.g., address, GPS location, etc.) of the UE can be provided to the provisioning component 602. As an example, a UE management portal 606 can comprise a networked interface, e.g., a self-service or self-care web portal, which can be accessed by a new customer or existing subscriber and can further support aspects of UE registration, activation, and management thereof. In another example, the customer care platform 608 can be accessed and operated by customer care agents to facilitate activation/deactivation of service, configuration of fees/rate plans, validation and changes of address, creation of subscriber accounts, etc.

According to an embodiment, the provisioning component 602 can assess and/or predict the radio environment at the UE's location to determine speed tiers that can be offered at that location. Typically, for fixed and/or nomadic UEs, the CQI and/or RI are more stable and predictable than those for truly mobile UEs. Further, cell site parameters (e.g., antenna configuration, cell loading, signal propagation, etc.) of one or more cells serving the location can also be analyzed to determine speed tiers that can be offered. In an aspect, the available speed tiers and corresponding charges can be provided to the user for selection. Additionally, or optionally, the charges can comprise flat fees for different combination of speed tiers and data usage. For example, a monthly rate of $30 can be charged for 150 GB per month with a DL/UL target throughput rate of 10 Mbps/1 Mbps; a monthly rate of $50 can be charged for 150 GB per month with a DL/UL target throughput rate of 25 Mbps/2 Mbps; a monthly rate of $65 can be charged for 150 GB per month with a DL/UL target throughput rate of 50 Mbps/5 Mbps and so on and so forth. Based on the user's selection, a user-selected speed tier can be assigned to the subscriber account and this speed-tier information can be stored within the HSS 204.

In one aspect, a billing component 610 can monitor communications transmitted via the communication network and generate (e.g., periodically) an invoice (e.g., bill) presentation for the subscriber based on the selected speed tier (and/or speed tier and data bucket combination). As an example, a predefined flat fee can be charged for a specific speed tier. A subscriber can access (e.g., view, or download) his/her billed usage and make a payment. Service can be disconnected by the subscriber or by billing system initiated on subscription cancelation, subscriber suspension, lack of invoice payment, etc.

Figure 7:
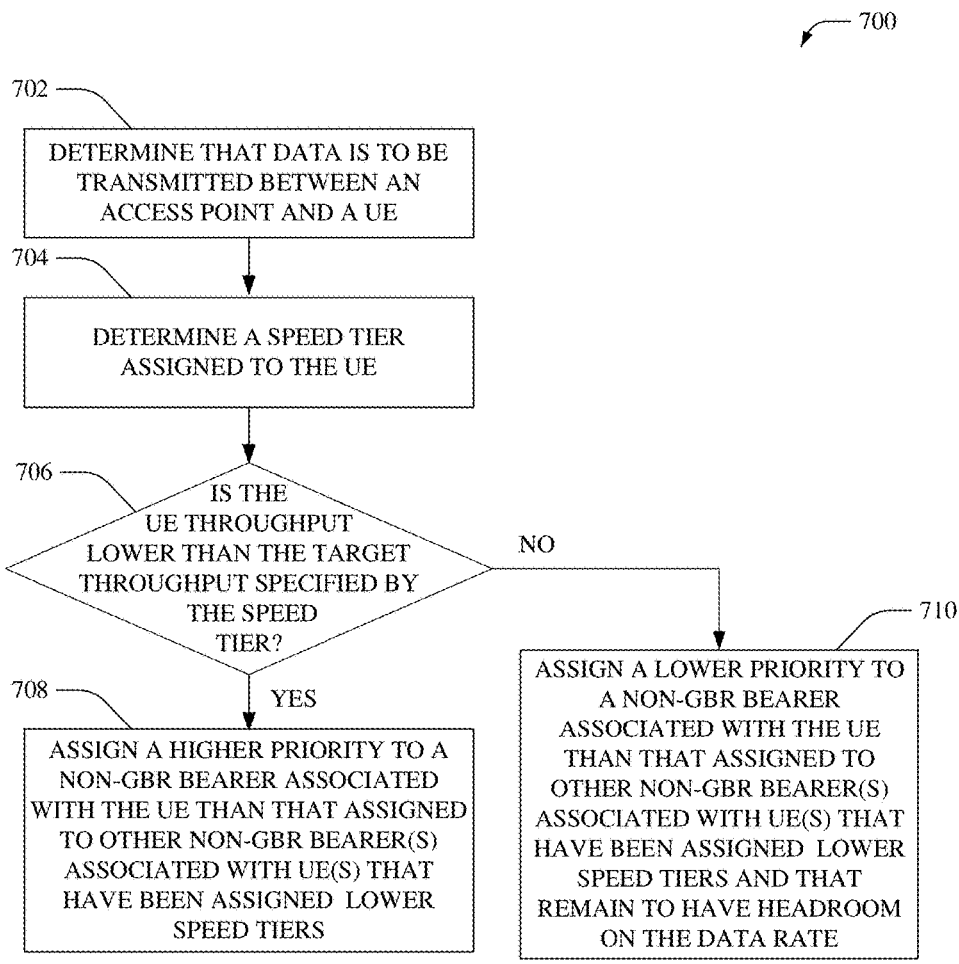
FIG. 7 illustrates an example method that allocates radio bearers (RBs) to a UE based on speed-tier data.
Figure 8:
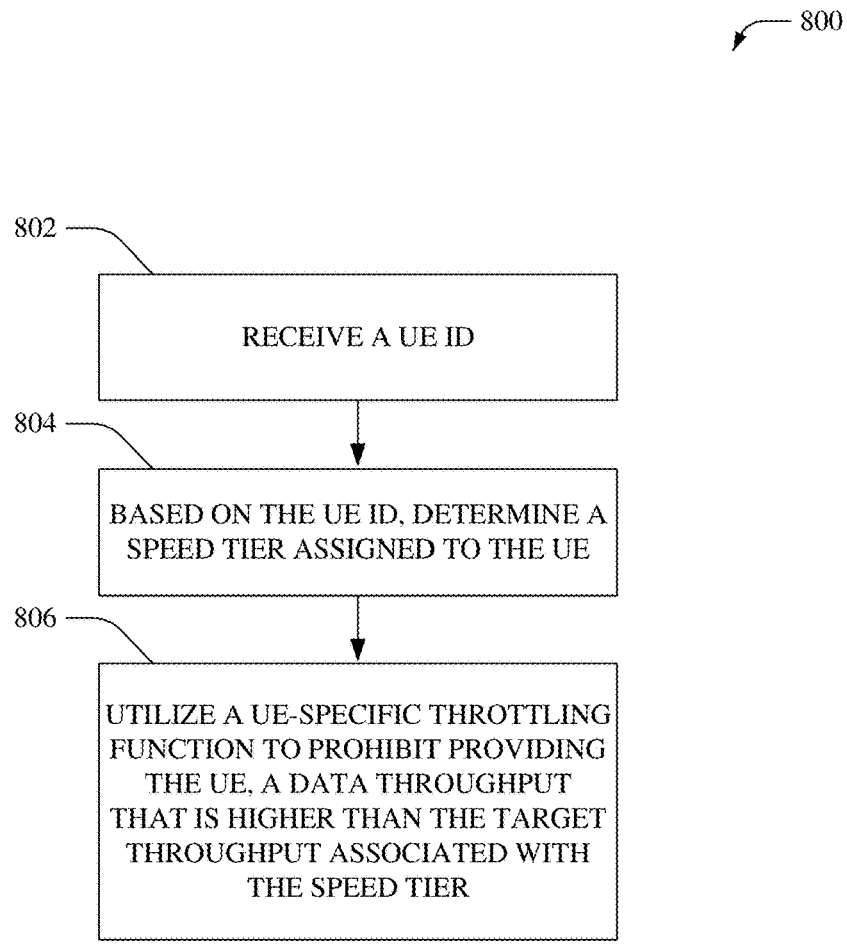
FIG. 8 illustrates an example method that facilitates speed-tier control via a throttling function.
Figure 9:
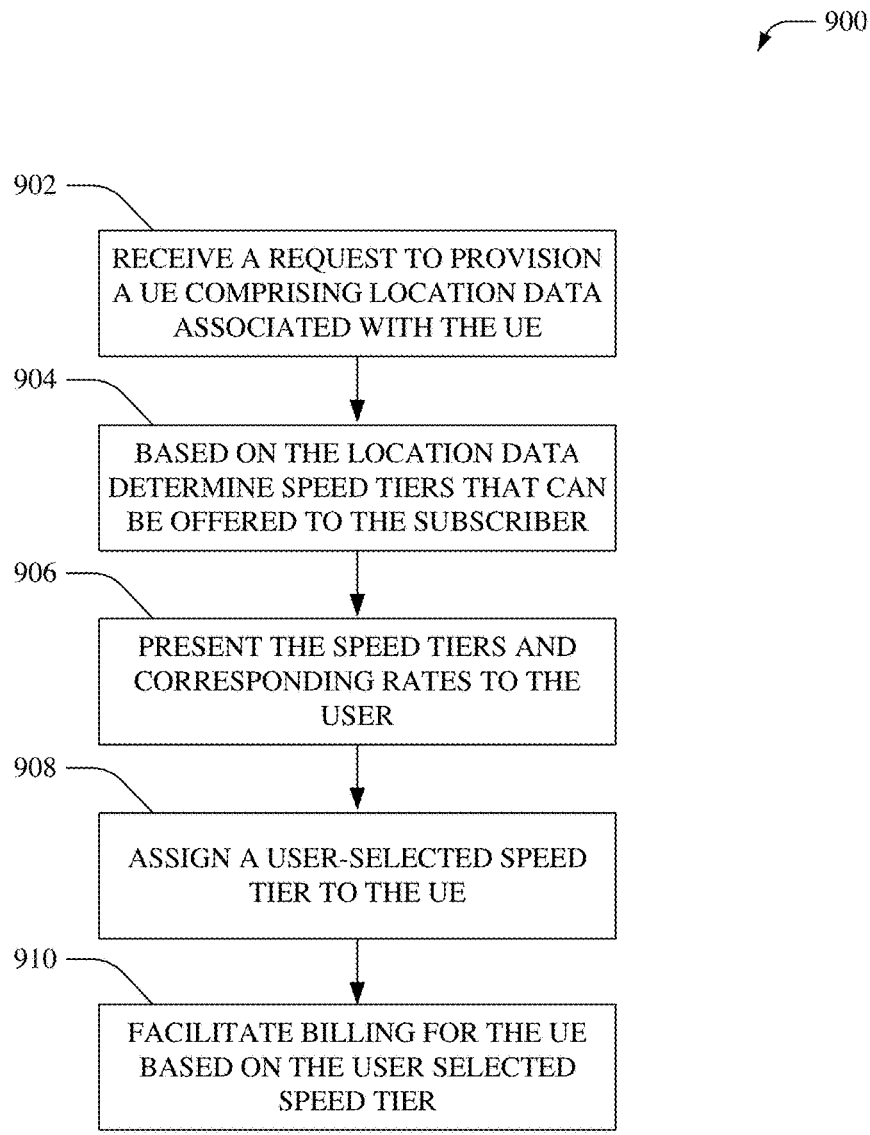
FIG. 9 illustrates an example method that that facilitates speed-tier based billing.

FIGS. 7-9 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 7 there illustrated is an example method 700 that allocates RBs to a UE based on speed-tier data, according to an aspect of the subject disclosure. In an aspect, method 700 can be implemented by one or more radio access network devices of a communication network (e.g., cellular network), such as, but not limited to an eNB. At 702, it can be determined that data is to be transferred between an access point and a UE. At 704, a speed tier assigned to the UE can be determined. For example, the speed tier can be received from a network data store (e.g., HSS) based on the UE ID. Further, at 706, it can be determined whether the throughput (e.g., DL and/or UL data rate) of the UE is lower than the target throughput specified by the speed tier. If determined that the throughput of the UE is lower than the target throughput, then at 708, a higher priority can be assigned to a non-GBR bearer associated with the UE than that assigned to other non-GBR bearer(s) associated with UE(s) that have been assigned lower speed tiers (than the speed tier assigned to the UE). Alternatively, if determined that the throughput of the UE is not lower than the target throughput, then at 710, a lower priority can be assigned to a non-GBR bearer associated with the UE than that assigned to other non-GBR bearer(s) associated with UE(s) that have been assigned lower speed tiers (than the speed tier assigned to the UE) and that remain to have headroom on the data rate.

FIG. 8 illustrates an example method 800 that facilitates speed tier control via a throttling function, according to an aspect of the subject disclosure. In one example, method 800 can be implemented by one or more network devices of the RLC layer. In another example, method 800 can be implemented by one or more network devices of the PDCP layer. At 802, a UE ID can be received (e.g., C-RNTI, IMSI, etc.). Further, at 804, a speed tier assigned to the UE can be determined based on the UE ID. For example, the speed tier can be retrieved from a network data store (e.g., HSS).

Furthermore, at 806, a UE-specific throttling function can be utilized to prohibit providing the UE, a data throughput that is higher than a target data throughput associated with the speed tier. As an example, the UE-specific throttling function can be implemented by allocating different buffer sizes in the RLC, controlling the segmentation size, and/or temporarily halting data transfer.

FIG. 9 illustrates an example method 900 that facilitates speed tier based billing, according to an aspect of the subject disclosure. In one example, method 900 can be implemented by one or more network devices of a communication network (e.g., cellular network). At 902, a request to provision a UE (and/or update a subscription) can be received, wherein the request comprises location data associated with the UE. As an example, in NGFW, the location data can comprise an address or area where the UE is deployed. At 904, speed tiers that can be offered to the UE can be determined based on the location data. For example, RF conditions, geographical data, weather data, and/or cell site data associated with the location and/or area can be utilized to determine the maximum speed that can be consistently provided to a UE within the location and/or area. At 906, the speed tiers (e.g., having corresponding target data rates that are equal to or less than the maximum speed) can be presented to the user of the UE. Moreover, each of the speed tires can be associated with a different billing fee. As a function of the presentation, the user can select one of the speed tiers and at 908, the user-selected speed tier can be assigned to the UE (and/or subscriber account associated with the UE). Further, at 910, billing for the UE can be facilitated based on a fee corresponding to the user-selected speed tier.

Figure 10:
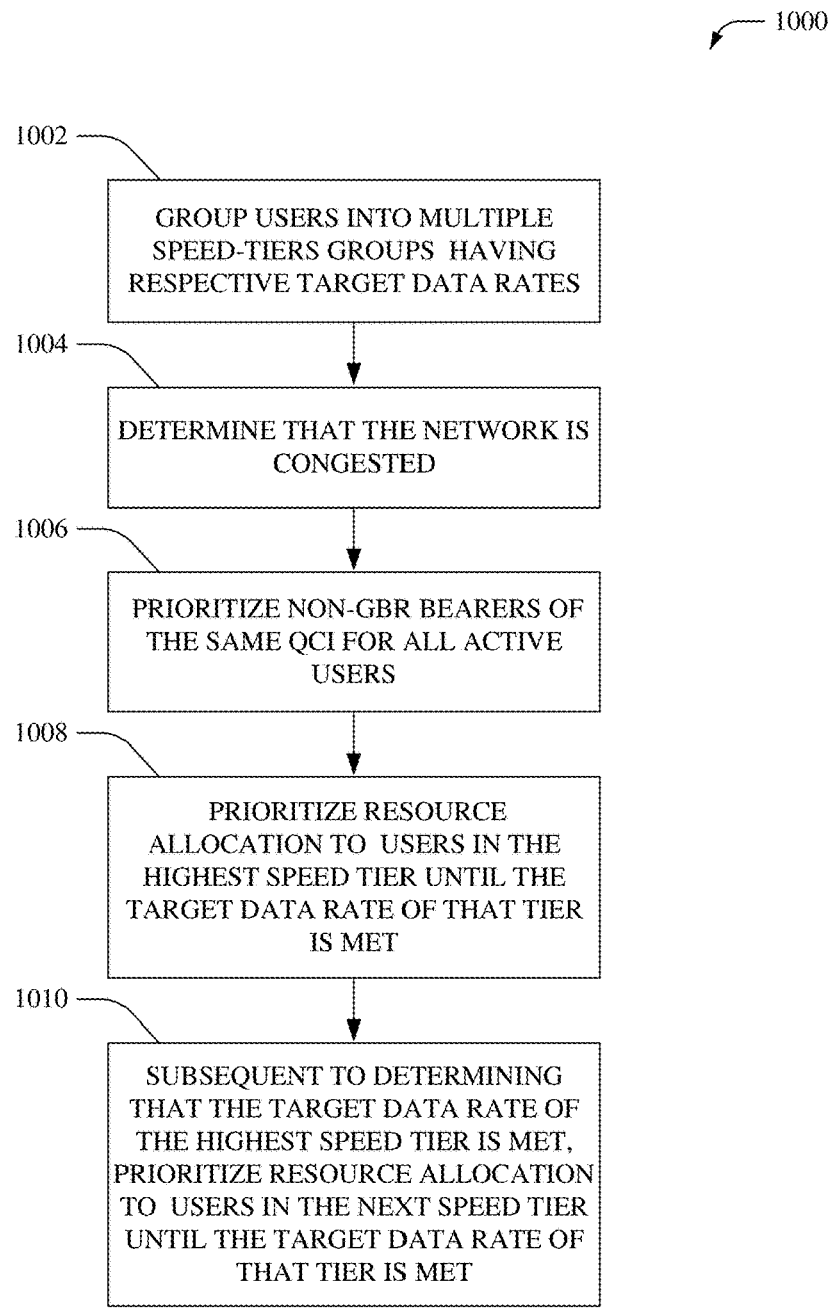
FIG. 10 illustrates an example method that that facilitates speed-tier based radio resource control.

FIG. 10 illustrates an example method 1000 that that facilitates speed-tier based radio resource control, according to an aspect of the subject disclosure. In one example, method 1000 can be implemented by one or more network devices of a communication network (e.g., cellular network). At 1001, users can be grouped into multiple speed-tier groups that have respective target data rates. For example, users can be assigned to one of tiers Tier-i (wherein i=1, 2, 3 . . . n and n can be most any integer greater than two) that correspond to respective target data rates/throughputs TP-i. In this example scenario, Tier-1 users have the highest target data rate/throughput (TP-1), such that TP-1>TP-2> . . . TP-i> . . . TP-n. It is noted that the target data rate for a speed tier is a summation of the data rate provided via all the established bearers including the GBR bears and non-GBR bearers for a specific user within that speed tier.

At 1004, it can be determined that the network is congested, for example, the demand for resources is greater than RBs that are available. At 1006, the non-GBR beaters of the same QCI for all active users can be prioritized. Moreover, at 1008, radio resource allocation to users in the highest speed-tier users group can be prioritized until the target data rate of the tier is met. Further, at 1010, subsequent to determining that the target data rate of the highest speed tier is met, radio resource allocation to users in the next highest speed-tier users group can be prioritized until the target data rate of that tier is met. For example, initially Tier 1 users can be given a higher priority than Tier 2 users, which can be given a higher priority than Tier 3 user, and so on and so forth. However, on determining that all the Tier 1 users have met the target TP1, the highest priority can be assigned to Tier 2 users.

In other words, respective priorities (Pi) can be assigned to the users in each group (Tier-i), wherein P1>P2> . . . Pi>Pn, if the users of each group have not met their target TP. Once all the Tier-i users have met their target TP-i, the highest priority will be given to the next class (TP-i+1) users not meeting the target TP-i+1.

Figure 11:
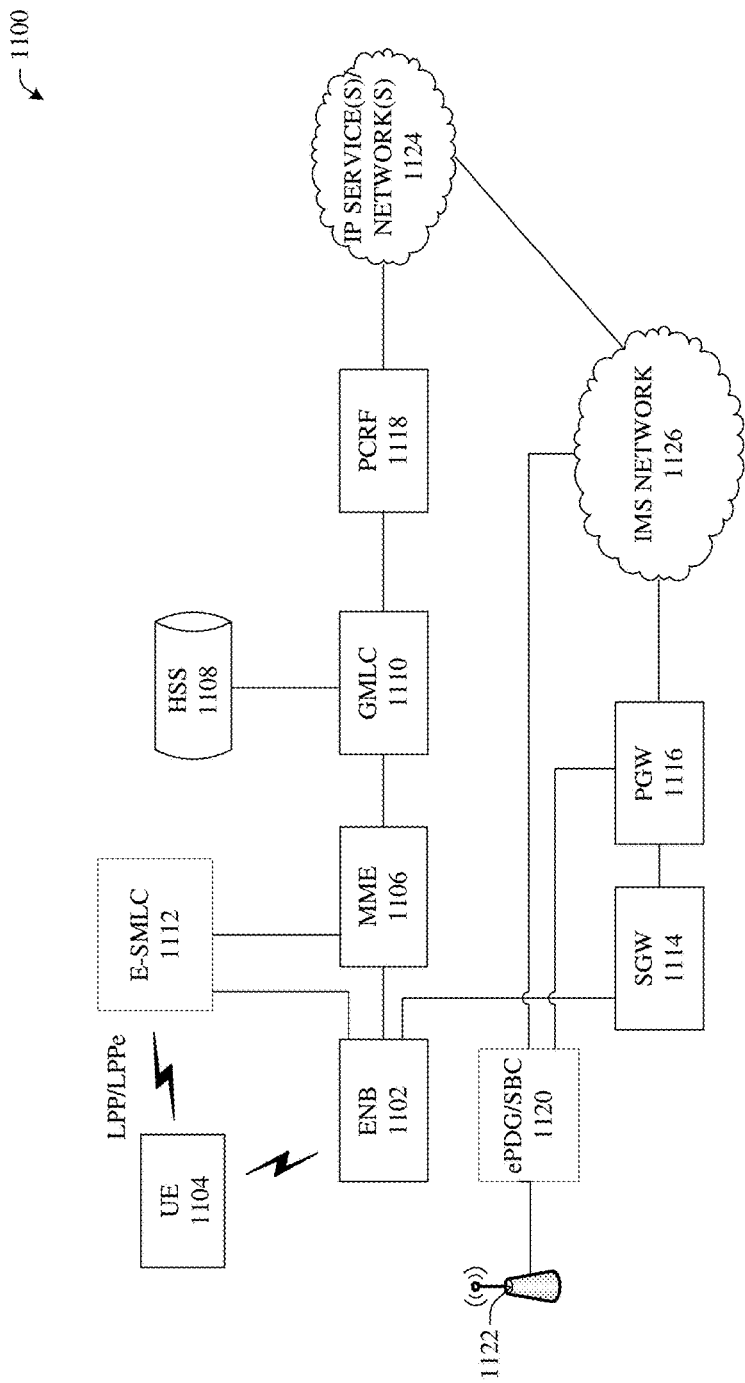
FIG. 11 illustrates a long term evolution (LTE) network architecture that can employ the disclosed architecture.

FIG. 11 illustrates a high-level block diagram that depicts an example LTE network architecture 1100 that can employ the disclosed communication architecture. In one aspect, network architecture 1100 can comprise at least a portion of systems 100-600. The evolved RAN for LTE consists of an eNB 1102 that can facilitate connection of UE 1104 to an evolved packet core (EPC) network. In one aspect, the UE 1104 is physical equipment such as a mobile phone or a laptop computer that is used by mobile subscribers, with a subscriber identity module (SIM). The SIM comprises IMSI and/or MSISDN, which is a unique identifier of a subscriber. The UE 1104 comprises an embedded client that receives and processes messages received by the UE 1104. As an example, the embedded client can be implemented in JAVA. In one aspect, the UE 1104 can be substantially similar to UE 206 and can comprise functionality as more fully described herein, for example, as described above with regards to UE 206. Further, the eNB 1102 can be substantially similar to access point 208, eNB 408, and/or eNB 410 and can comprise functionality as more fully described herein, for example, as described above with regards to access point 208, eNB 408, and/or eNB 410.

The connection of the UE 1104 to the evolved packet core (EPC) network is subsequent to an authentication, for example, a SIM-based authentication between the UE 1104 and the evolved packet core (EPC) network. In one aspect, the MME 1106 provides authentication of the UE 1104 by interacting with the HSS 1108 via a Gateway Mobile Location Centre (GMLC) 1110. The GMLC 1110 can request routing information from the HSS 1108. The HSS 1108 contains a subscriber profile and keeps track of which core network node is currently handling the subscriber. It also supports subscriber authentication and authorization functions (AAA). In networks with more than one HSS 1108, a subscriber location function provides information on the HSS 1108 that contains the profile of a given subscriber. In one aspect, this authentication can be utilized to secure population of the user/device profile data by a primary user. Further, the MME 1106 can be coupled to an enhanced Serving Mobile Location Center (E-SMLC) 1112 supports location services (LCS) and coordinates positioning of the UE 1104. The UE 1104 and the E-SMLC can communicate using an LTE Positioning Protocol (LPP) and/or LPP extensions (LPPe). In one aspect, the MME 1106 can be substantially similar to MME 202 and can comprise functionality as more fully described herein, for example, as described above with regards to MME 202. Further, the HSS 1108 can be substantially similar to HSS 204 and can comprise functionality as more fully described herein, for example, as described above with regards to HSS 204.

As an example, the eNB 1102 can host PHY, MAC, RLC, and/or PDCP layers that comprise the functionality of user-plane header-compression and encryption. In addition, the eNB 1102 can implement at least in part Radio Resource Control (RRC) functionality (e.g., radio resource management, admission control, scheduling, cell information broadcast, etc.). The eNB 1102 can be coupled to a serving gateway (SGW) 1114 that facilitates routing of user data packets and serves as a local mobility anchor for data bearers when the UE 1104 moves between eNBs. The SGW 1114 can act as an anchor for mobility between LTE and other 3GPP technologies (GPRS, UMTS, etc.). When UE 1104 is in an idle state, the SGW 1114 terminates a downlink (DL) data path and triggers paging when DL data arrives for the UE 1104. Further, the SGW 1114 can perform various administrative functions in the visited network such as collecting information for charging and lawful interception. In one aspect, the SGW 1114 can be coupled to a PGW 1116 that provides connectivity between the UE 1104 and external packet data networks such as IP service(s)/network(s) 1124 via the IP Multimedia Subsystem (IMS) network 1126. Moreover, the PGW 1116 is a point of exit and entry of traffic for the UE 1104. It is noted that the UE 1104 can have simultaneous connectivity with more than one PGW (not shown) for accessing multiple PDNs. Among other functions, the PGW 1116 can "anchor" mobility between 3GPP and non-3GPP technologies. The PGW 1116 can provide connectivity from the UE (e.g., UE 1104) to external packet data network (PDN) by being the point of entry or exit of traffic for the UE. Additionally, the PGW 1116 can facilitate policy enforcement, packet filtration for users, charging support, etc.

The PGW 1116 performs IP address allocation for the UE 1104, as well as QoS enforcement and implements flow-based charging according to rules from a Policy Control and Charging Rules Function (PCRF) 1118. The PCRF 1118 can facilitate policy control decision-making and control flow-based charging functionalities in a Policy Control Enforcement Function (PCEF), which resides in the PGW 1116. The PCRF 1118 can store data (e.g., QoS class identifier and/or bit rates) that facilitates QoS authorization of data flows within the PCEF. In one aspect, the PGW 1116 can facilitate filtering of downlink user IP packets into the different QoS-based bearers and perform policy enforcement, packet filtering for each user, charging support, lawful interception and packet screening. Further, the PGW 1116 acts as the anchor for mobility between 3GPP and non-3GPP technologies such as WiMAX and 3GPP2 (CDMA 1X and EvDO). An Evolved Packet Data Gateway (ePDG) 1120 is employed for communications between the EPC and untrusted non-3GPP networks that require secure access, such as a Wi-Fi, LTE metro, and femtocell access networks, for example served by access point 1122. Although a LTE network architecture 1100 is described and illustrated herein, it is noted that most any communication network architecture can be utilized to implement the disclosed embodiments.

Figure 12:
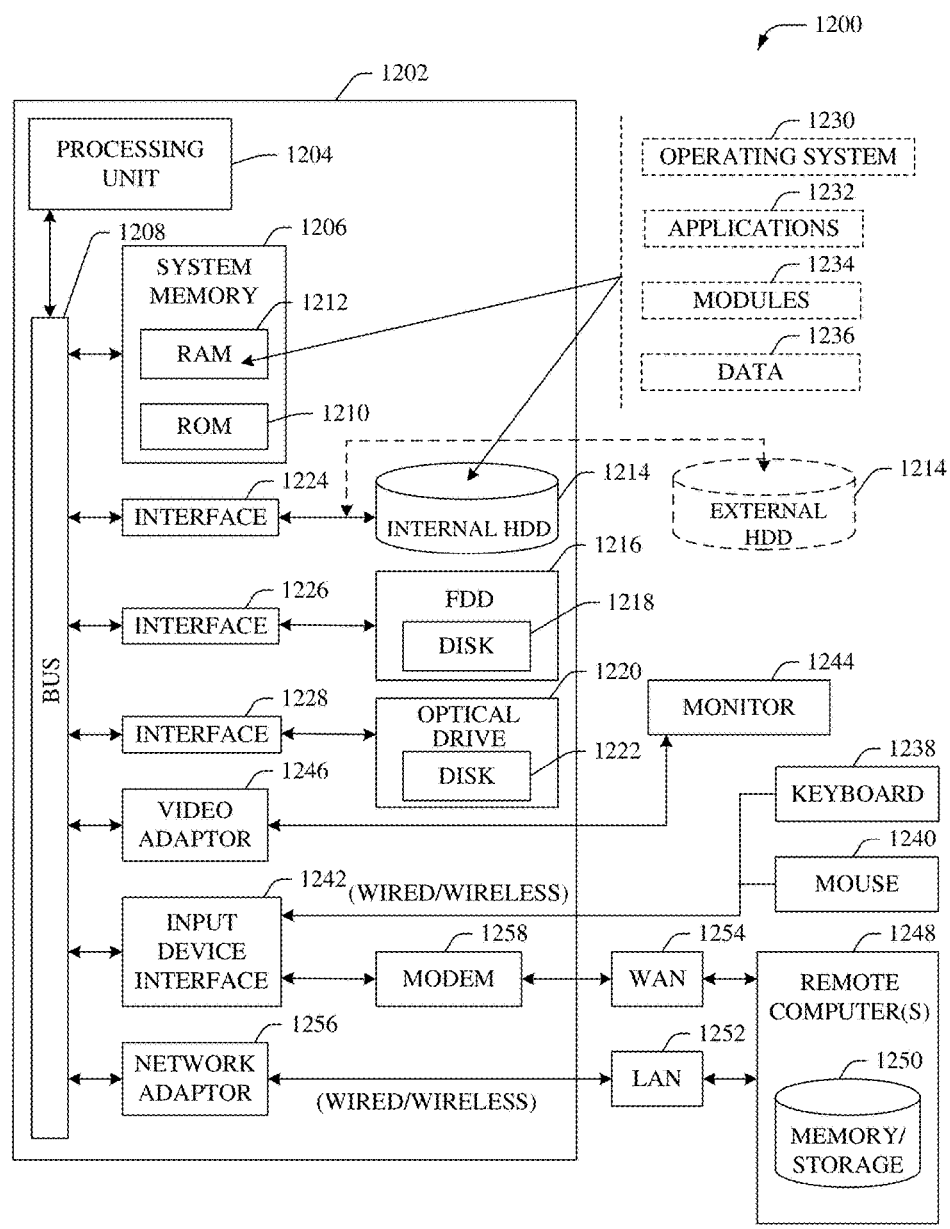
FIG. 12 illustrates a block diagram of a computer operable to execute the disclosed communication architecture.

Referring now to FIG. 12, there is illustrated a block diagram of a computer 1202 operable to execute the disclosed communication architecture. In order to provide additional context for various aspects of the disclosed subject matter, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will note that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media.

With reference again to FIG. 12, the example environment 1200 for implementing various aspects of the specification comprises a computer 1202, the computer 1202 comprising a processing unit 1204, a system memory 1206 and a system bus 1208. As an example, the component(s), application(s) server(s), equipment, system(s), interface(s), gateway(s), controller(s), node(s), entity(ies), function(s), cloud(s) and/or device(s) (e.g., scheduling component 102, tracking component 104, priority determination component 106, RB allocation component 108, MME 202, HSS 204, access point 208, UE 206, throughput throttle component 308, retransmission segmentation component 312, throughput throttle component 404, header compression component 406, eNB1 408, eNB2 410, gNB 412, feedback component 502, network management device 504, provisioning component 602, POS device 604, UE management portal 606, customer care platform 608, billing component 610, eNB 1102, UE 1104, MME 1106, HSS 1108, GMLC 1110, E-SMLC 1112, SGW 1114, PGW 1116, PCRF 1118, ePDG/SBC 1120, access point 1122, IP services/networks 1124, IMS network 1126, etc.) disclosed herein with respect to systems 100-600 and 1100 can each comprise at least a portion of the computer 1202. The system bus 1208 couples system components comprising, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 comprises read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during startup. The RAM 1212 can also comprise a high-speed RAM such as static RAM for caching data.

The computer 1202 further comprises an internal hard disk drive (HDD) 1214, which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1212, comprising an operating system 1230, one or more application programs 1232, other program modules 1234 and program data 1236. All or portions of the operating system, applications, modules, and/or data can also be cached in the RAM 1212. It is noted that the specification can be implemented with various commercially available operating systems or combinations of operating systems.

A user can enter commands and information into the computer 1202 through one or more wired/wireless input devices, e.g., a keyboard 1238 and/or a pointing device, such as a mouse 1240 or a touchscreen or touchpad (not illustrated). These and other input devices are often connected to the processing unit 1204 through an input device interface 1242 that is coupled to the system bus 1208, but can be connected by other interfaces, such as a parallel port, an IEEE 1394 serial port, a game port, a USB port, an infrared (IR) interface, etc. A monitor 1244 or other type of display device is also connected to the system bus 1208 via an interface, such as a video adapter 1246.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically comprises many or all of the elements described relative to the computer 1202, although, for purposes of brevity, only a memory/storage device 1250 is illustrated. The logical connections depicted comprise wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also comprise a wireless access point disposed thereon for communicating with the wireless adapter 1256.

When used in a WAN networking environment, the computer 1202 can comprise a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be noted that the network connections shown are example and other means of establishing a communications link between the computers can be used.

The computer 1202 is operable to communicate with any wireless devices or entities operatively disposed in wireless communication, e.g., desktop and/or portable computer, server, communications satellite, etc. This comprises at least Wi-Fi and Bluetooth™ wireless technologies or other communication technologies. Thus, the communication can be a predefined structure as with a conventional network or simply an ad hoc communication between at least two devices.

Wi-Fi, or Wireless Fidelity networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 13:
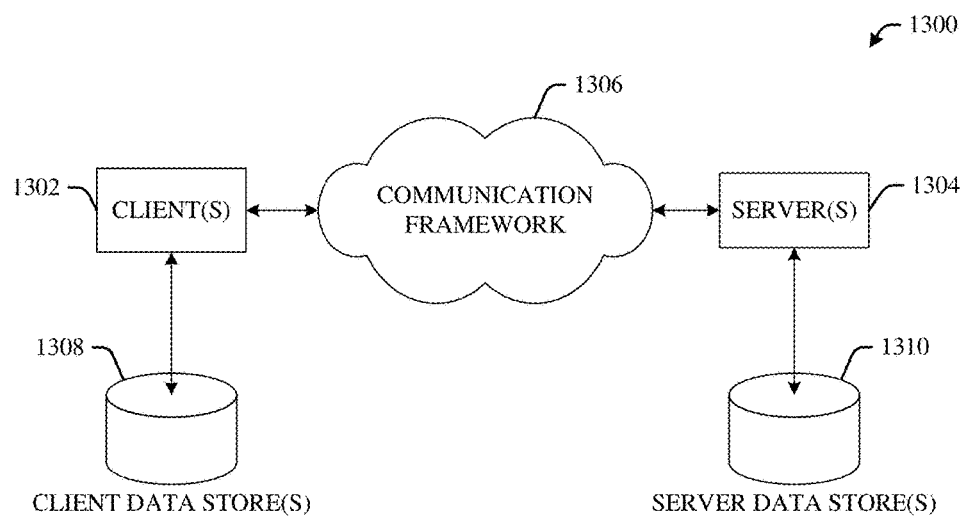
FIG. 13 illustrates a schematic block diagram of a computing environment in accordance with the subject specification

Referring now to FIG. 13, there is illustrated a schematic block diagram of a computing environment 1300 in accordance with the subject specification. The system 1300 comprises one or more client(s) 1302. The client(s) 1302 can be hardware and/or software (e.g., threads, processes, computing devices).

The system 1300 also comprises one or more server(s) 1304. The server(s) 1304 can also be hardware and/or software (e.g., threads, processes, computing devices). The servers 1304 can house threads to perform transformations by employing the specification, for example. One possible communication between a client 1302 and a server 1304 can be in the form of a data packet adapted to be transmitted between two or more computer processes. The data packet may comprise a cookie and/or associated contextual information, for example. The system 1300 comprises a communication framework 1306 (e.g., a global communication network such as the Internet, cellular network, etc.) that can be employed to facilitate communications between the client(s) 1302 and the server(s) 1304.

Communications can be facilitated via a wired (comprising optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      determining speed tier data indicative of respective speed tiers assigned to user equipment served by an access point device of a communication network, wherein the respective speed tiers specify target data rates for communication between the user equipment and the access point device; and
      in response to determining that an observed data rate, associated with a first user equipment of the user equipment, is not less than a first target data rate, of the target data rates, that corresponds to first speed tier of the speed tiers assigned to the first user equipment, assigning a first priority to a first non-guaranteed bit rate bearer that is associated with the first user equipment, wherein the first priority is lower than a second priority that is to be assigned to a second non-guaranteed bit rate bearer that is associated with a second user equipment, of the user equipment, that has been assigned a second speed tier of the speed tiers, wherein the first speed tier is higher than the second speed tier, wherein the second user equipment is determined to not have exceeded a second target data rate of the target data rates that corresponds to the second speed tier, and wherein the first non-guaranteed bit rate bearer and the second non-guaranteed bit rate bearer belong to a common quality of service class.

2. The system of claim 1, wherein the operations further comprise: allocating, to the first user equipment, a number of resource blocks within a defined time interval, wherein the number of resource blocks is determined based on the first target data rate.

3. The system of claim 1, wherein the user equipment are stationary devices.

4. The system of claim 1, wherein the communication network comprises a nomadic wireless network.

5. The system of claim 1, wherein the operations further comprise:
   in response to determining that the first observed data rate is less than the first target data rate, assigning a third priority to the first non-guaranteed bit rate bearer, wherein the third priority is higher than the second priority.

6. The system of claim 1, wherein the operations further comprise:

implementing a throughput throttling function that prohibits the observed data rate from exceeding the first target data rate.

7. The system of claim 6, wherein the implementing comprises allocating, for the first user equipment, a buffer having a size that corresponds to the first speed tier.

8. The system of claim 6, wherein the implementing comprises controlling, based on the speed tier data, a segmentation size during segmentation of service data units.

9. The system of claim 6, wherein the implementing comprises implementing the throughput throttling function in a radio link layer.

10. The system of claim 6, wherein the implementing comprises implementing the throughput throttling function in a packet data convergence control layer.

11. The system of claim 1, wherein the operations further comprise:
in response to determining that a physical resource block utilization of the access point device satisfies a defined criterion, directing, to a network device of the communication network, feedback data indicative of the physical resource block utilization to facilitate management of the communication network.

12. The system of claim 1, wherein the speed tiers are associated with respective billing fees.

13. The system of claim 1, wherein the communication network is a fixed wireless communication network.

14. A method, comprising:
receiving, by an access point device comprising a processor, speed tier data assigned to a first user equipment, wherein the speed tier data is indicative of a first target data throughput associated with the first user equipment;
in response to determining that a monitored data throughput, associated with the first user equipment, is less than the first target data throughput, assigning, by the access point device, a first priority to a first non-guaranteed bit rate bearer that is associated with the first user equipment, wherein the first priority is higher than a second priority that is to be assigned to a second non-guaranteed bit rate bearer that is associated with a second user equipment that has been assigned a second target data throughput, wherein the first target data throughput is greater than the second target data throughput, and wherein the first non-guaranteed bit rate bearer and the second non-guaranteed bit rate bearer belong to a common quality of service class; and
in response to determining that the monitored data throughput is not less than the first target data throughput, assigning, by the access point device, a third priority to the first non-guaranteed bit rate bearer, wherein the third priority is lower than the second priority, and wherein the second user equipment is determined to not have exceeded the second target data throughput.

15. The method of claim 14, further comprising:
in response to determining that the monitored data throughput has exceeded the first target data throughput, decreasing, by the access point device, a data throughput for a wireless communication to facilitate providing a consistent user experience.

16. The method of claim 14, further comprising:
in response to determining that the monitored data throughput has exceeded the first target data throughput, temporarily halting, by the access point device, a transfer of data between the user equipment and the access point device.

17. The method of claim 14, wherein the receiving comprises receiving the speed tier data from a home subscriber server.

18. A machine-readable storage medium, comprising executable instructions that, when executed by a processor of a system, facilitate performance of operations, comprising:
determining speed tier data indicative of respective speed tiers assigned to user equipment served by an access point device, wherein the respective speed tiers are associated with target data throughput values for communication between the user equipment and the access point device;
in response to determining that an observed data throughput, associated with a first user equipment of the user equipment, is greater than a first value, of the target data throughput values, that corresponds to first speed tier of the speed tiers assigned to the first user equipment, assigning a first priority to a first non-guaranteed bit rate bearer that is associated with the first user equipment, wherein the first priority is lower than a second priority that is to be assigned to a second non-guaranteed bit rate bearer that is associated with a second user equipment, of the user equipment, that has been assigned a second speed tier of the speed tiers, wherein the first speed tier is higher than the second speed tier, wherein the second user equipment is determined to not have exceeded a second value of the target data throughput values that corresponds to the second speed tier, and wherein the first non-guaranteed bit rate bearer and the second non-guaranteed bit rate bearer belong to a common quality of service class; and.

19. The machine-readable storage medium of claim 18, wherein the access point device comprises an access point device of a fixed wireless communication network.

20. The machine-readable storage medium of claim 18, wherein the user equipment are stationary.

* * * * *